(12) United States Patent
Ishikawa et al.

(10) Patent No.: US 7,694,607 B2
(45) Date of Patent: Apr. 13, 2010

(54) WAVE GEAR DRIVE WITH CONTINUOUS MESHING, HIGH RATCHETING TORQUE TOOTH PROFILE

(75) Inventors: Shoichi Ishikawa, Yokohama (JP); Noboru Takizawa, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 509 days.

(21) Appl. No.: 11/652,049

(22) Filed: Jan. 11, 2007

(65) Prior Publication Data

US 2007/0180947 A1    Aug. 9, 2007

(30) Foreign Application Priority Data

Feb. 9, 2006    (JP) .............................. 2006-033068

(51) Int. Cl.
    *F16H 33/00* (2006.01)
(52) U.S. Cl. .......................................... 74/640; 74/462
(58) Field of Classification Search .................. 74/462, 74/457
    See application file for complete search history.

(56) References Cited

U.S. PATENT DOCUMENTS

| | | | |
|---|---|---|---|
| 2,906,143 A | | 9/1959 | Musser |
| 5,782,143 A | * | 7/1998 | Ishikawa ..................... 74/640 |
| 5,918,508 A | * | 7/1999 | Ishikawa ..................... 74/640 |
| 6,167,783 B1 | * | 1/2001 | Ishikawa ..................... 74/640 |

FOREIGN PATENT DOCUMENTS

| | | |
|---|---|---|
| JP | 45-41171 | 12/1970 |
| JP | 63-115943 A | 5/1988 |
| JP | 64-079448 A | 3/1989 |
| JP | 7-167228 A | 7/1995 |
| WO | 2005/043006 A1 | 5/2005 |

* cited by examiner

*Primary Examiner*—Roger L Pang
*Assistant Examiner*—Erin D Bishop
(74) *Attorney, Agent, or Firm*—Buchanan Ingersoll & Rooney PC

(57) ABSTRACT

A wave gear drive comprises a circular rigid internal gear and a flexible external gear inside the rigid internal gear. A wave generator in the flexible external gear flexes the flexible external gear into an elliptical shape. The cross-section of the flexible external gear perpendicular to the axis at a point in the tooth trace direction of the flexible external gear is set as the main cross-section. The rigid internal gear and flexible external gear are gears with a module m, and the flexible external gear has a number of teeth that is smaller than the number of teeth of the rigid internal gear. The moving route M of a tooth of the flexible external gear with respect to a tooth of the rigid internal gear that accompanies rotation of the wave generator when meshing of the teeth in the main cross-section is approximated by rack meshing. On the entering side of the meshing of the teeth to the major axis of the moving route M, a first similar curve AC is obtained by similarity transformation of a pressure angle .alpha. orthogonal to the direction of the moving route M. The first similar curve AC is employed as the basic addendum tooth profile of the rigid internal gear. A second similar curve CB is obtained by rotating the first similar curve AC 180° about endpoint C, and by a similarity transformation in which the first similar curve AC is multiplied by a ratio of similitude $(1-\lambda)/\lambda$. The second similar curve CB is employed as the basic addendum tooth profile of the flexible external gear.

5 Claims, 6 Drawing Sheets

(a)  (b)  (c)

(a)

(b)

US 7,694,607 B2

WAVE GEAR DRIVE WITH CONTINUOUS MESHING, HIGH RATCHETING TORQUE TOOTH PROFILE

BACKGROUND OF THE INVENTION

1. Field of the Invention

The present invention relates to a wave gear drive, particularly to a wave gear drive having a tooth profile that enables high ratcheting torque while also maintaining continuous meshing.

2. Description of the Prior Art

Since the wave gear drive drive was first invented by C. W. Musser (see U.S. Pat. No. 2,906,143), various types of wave gear drives have been invented by many researchers, including Musser and the present inventor. There have also been various inventions relating just to the tooth profiles used in wave gear drives. For example, one of the present inventors has proposed making the basic tooth profile an involute tooth profile (see JP-B 45-41171), and a method of designing a tooth profile in which the addendum profiles for wide contact between the rigid internal gear and flexible external gear are derived using a rack approximation of the meshing between the two gears (see JP-A 63-115943 and JP-A 64-79448). There has also been proposed an invention for avoiding interference between rack-approximated tooth profiles (see JP-A 7-167228).

In wave gear drives with high reduction ratios in which the number of the teeth of the two gears exceeds, for example, 160, what is called ratcheting may occur during high negative torque operation. This led one of the present inventors to propose a tooth profile that can prevent ratcheting while at the same maintaining continuous contact (see WO No. 2005/043006). In that disclosure, the deflection amount of the major axis of the elliptical rim neutral line of the flexible external gear at a cross-section of the flexible external gear perpendicular to the axis at an arbitrarily selected location in the tooth trace direction is set at $2\kappa mn (\kappa>1)$, that is, positive deflection, and in the cross-section, the meshing of the teeth of both gears is approximated by rack meshing to obtain the moving route of the teeth of the external gear moved by the rotation of a wave generator, and the basic tooth profile of the two gears is defined by utilizing the curved portion of the moving route from the major axis of the moving route to the tooth departing side.

SUMMARY OF THE INVENTION

There is currently a strong market demand for wave gear drives having improved load torque performance, and a particular need to be able to prevent ratcheting during high reduction operation. In order to prevent ratcheting during high load torque, in the case of a high reduction ratio when the number of teeth of the two gears is 160 or more, the tooth depth has to be increased, and continuous meshing is required in order to raise torque capacity.

Accordingly, an object of the present invention is to provide a wave gear drive that, in order to prevent ratcheting during high load torque and enable torque capacity to be raised, has a tooth profile that enables the tooth depth to be increased and meshing to be continuously maintained.

In the case of the present invention, since the tooth depth is related to the deflection amount, the tooth depth is increased so that the amount of positive radial deflection in the main cross-section of the flexible external gear is larger than the standard deflection amount $2 mn$; for example, the positive deflection is $\kappa mn (\kappa>1$, wherein $\kappa$ is, for example, 1.2).

To impart continuous contact characteristics to the tooth profile, also, when continuous meshing of the two gears is effected by using a rack approximation of the moving route of the teeth of the flexible external gear in the main cross-section, the formerly-ignored moving route on the entering side to the deepest position of meshing is incorporated into the range of meshing of the two gears. Moreover, contact of a linear portion of both tooth profiles is utilized in the final meshing following the meshing of the two tooth profiles on the departing side, from the deepest engaged position of the moving route.

To achieve the above object, the present invention provides a wave gear drive, comprising:

a circular rigid internal gear, a flexible external gear disposed within the rigid internal gear, a wave generator disposed within the flexible external gear, the flexible external gear having a flexible cylindrical body and an annular diaphragm that extends in a radial direction from a back end of the cylindrical body, a toothed portion formed on a front end opening portion of the cylindrical body that is flexed into an elliptical shape by a flexing amount generated by the wave generator from a back end portion on the diaphragm side to a front end portion on the opening side thereof that is approximately proportional to distance from the diaphragm, wherein a cross-section of the flexible external gear perpendicular to the axis at a prescribed location in a tooth trace direction of the flexible external gear is set to be the main cross-section, the rigid internal gear and flexible external gear are gears with a module m, the flexible external gear has a number of teeth that is set to be smaller by $2n$ (n is a positive integer) than a number of teeth of the rigid internal gear, a radial flexing amount of a major axis of an elliptical rim neutral line of the flexible external gear is set at $\kappa mn (\kappa>1)$, a moving route M of a tooth of the flexible external gear with respect to a tooth of the rigid internal gear that accompanies rotation of the wave generator when meshing of the teeth in the main cross-section is approximated by rack meshing is obtained, on an entering side of the meshing of the teeth to the major axis of the moving route M, a first similar curve AC is obtained by similarity transformation of a pressure angle a defined as an angle of inclination in a direction orthogonal to the direction of the moving route M in a range that is from 90° at point A in the initial meshing phase to a minimum of 0° at point B, or a range that is midway from point A to point B, using a ratio of similitude $\lambda(\lambda<1)$ with point A as center of similarity, the first similar curve AC is employed as the basic addendum tooth profile of the rigid internal gear, a second similar curve CB is obtained by rotating the first similar curve AC through an angle of 180° with the endpoint C thereof as center of similarity, and by similarity transformation in which the first similar curve AC is multiplied by a ratio of similitude $(1-\lambda)/\lambda$, and the second similar curve CB is employed as the basic addendum tooth profile of the flexible external gear.

In the present invention, also, the tooth profile of the rigid internal gear is set as follows. First, a generation curve is obtained that is generated by moving the basic addendum tooth profile defined by the second similar curve CB of the flexible external gear along the moving route M, from a deepest point B on the major axis of the moving route M to a point E on a tooth departing side on the moving route M at which the pressure angle is $\alpha_e$ ($0°<\alpha_e<20°$), and this generation curve is employed as the basic dedendum profile of the rigid internal gear. Then, at an endpoint F on the generation curve corresponding to point C on the second similar curve CB, a dedendum tooth profile defined by the generation curve and the basic addendum profile defined by the first similar curve AC are intersected at point J by a straight line representing a line tangent to the generation curve, and the dedendum profile DF, intermediate linear profile FJ and addendum tooth profile JA are employed as the tooth profile of the rigid internal gear.

The present invention also sets the tooth profile of the flexible external gear as follows. First, point F on the second similar curve CB at which the pressure angle is $\alpha_e$ when endpoint B of the second similar curve CB that defines the basic addendum profile of the flexible external gear reaches point E on the moving route M is obtained, a straight line FG of a prescribed length representing a line tangent to the curve is connected to endpoint F of curve EF, and the endpoint G of line FG is smoothly connected to a fillet curve GH that defines a dedendum tooth profile so as not to interfere with the basic addendum profile of the rigid internal gear.

To ensure that effective meshing can be maintained at a cross-section perpendicular to the axis other than the main cross-section, relieving is applied to the teeth of the flexible external gear so that the position of the shallowest apex of the moving route obtained in each cross-section perpendicular to the tooth trace of the flexible external gear matches the position of the shallowest apex of the moving route in the main cross-section.

This invention allows a tooth depth to be used that is larger than that used when the radial deflection amount of the flexible external gear is the standard amount ($\kappa=1$), thereby enabling higher ratcheting torque meshing of the two gears. Moreover, in the main cross-section, continuous meshing of the rigid internal gear and flexible external gear can be realized, from the initial contact between the addendums of the gears, the meshing of the addendum of the flexible external gear with the dedendum of the rigid internal gear after the deepest part of the moving route is entered, and the completion of contact between the linear portions of the two gears. Therefore, the present invention makes it possible to achieve a wave gear drive having a high ratcheting torque tooth profile.

DESCRIPTION OF THE PREFERRED EMBODIMENT

The wave gear drive according to the present invention will now be explained with reference to the drawings.

Configuration

Figure 1:
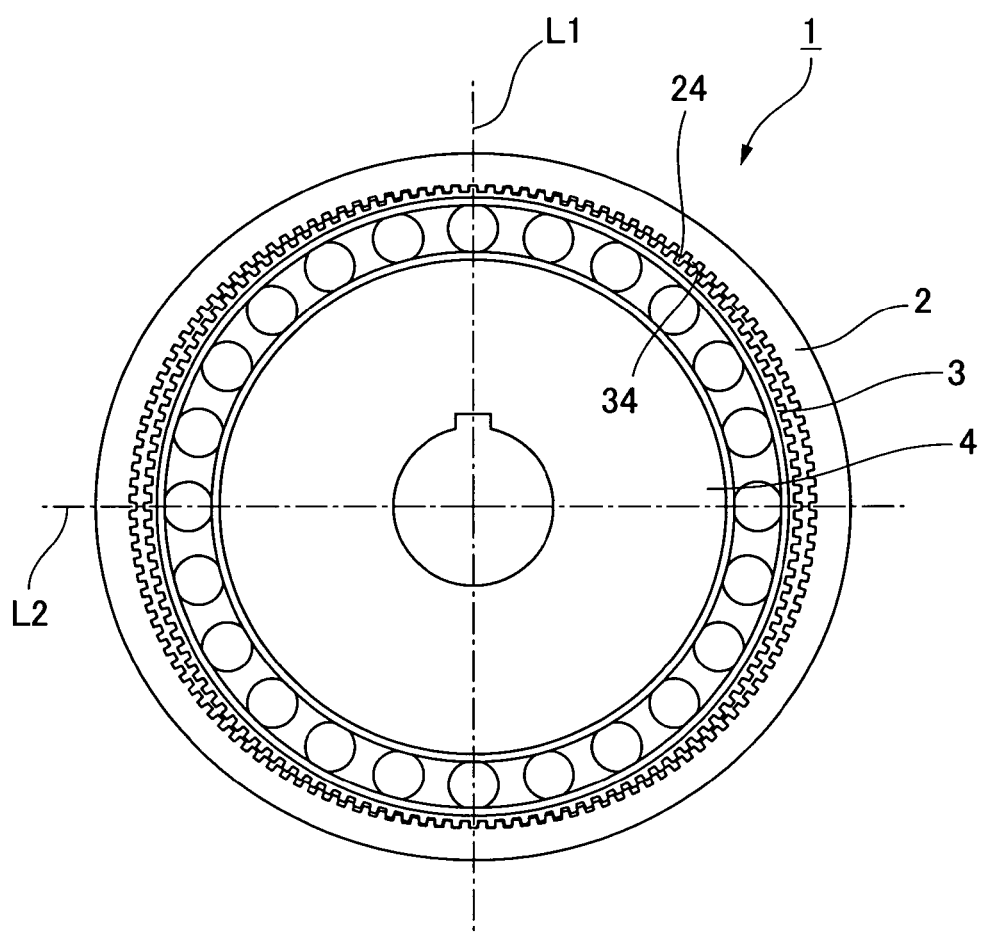
FIG. 1 is a general front view of a wave gear drive according to the present invention.
Figure 2:
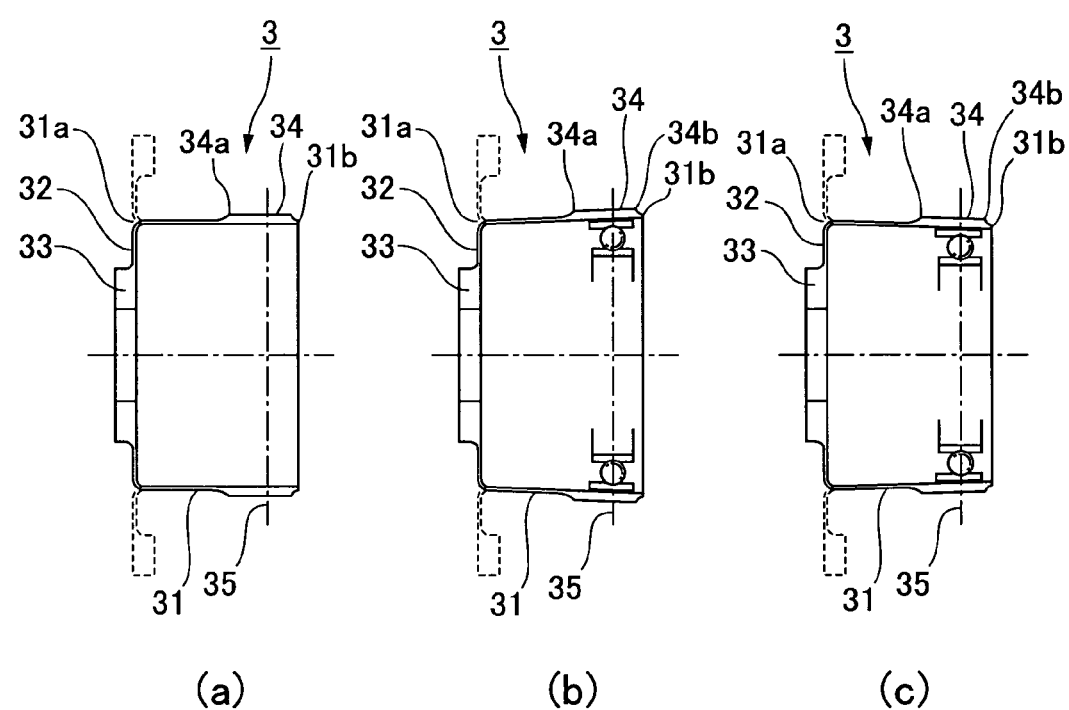
FIG. 2 is an explanatory diagram showing an axial cross-section that includes the flexing condition of the flexible external gear, with (a) showing the state before deformation, (b) a cross-section that includes the major axis of the ellipse after deformation, and (c) a cross-section that includes the minor axis of the ellipse after deformation.

FIG. 1 shows a front view of the wave gear drive of the present invention, and FIG. 2 shows an axial cross-section of the opening of the flexible external gear flexed into an elliptical shape, with (a) showing the state before deformation, (b) showing a cross-section that includes the major axis of the ellipse after deformation, and (c) showing a cross-section that includes the minor axis after deformation. In FIG. 2, the solid lines indicate a cup-shaped flexible external gear, and the broken lines indicate a silk-hat-shaped flexible external gear.

As shown in the drawings, wave gear drive 1 has a circular rigid internal gear 2, inside which is disposed a flexible external gear 3. Inside the flexible external gear 3, there is a wave generator 4 that has an elliptical profile. The number of teeth of the flexible external gear 3 is smaller by 2 n (n is a positive integer) than the number of teeth of the rigid internal gear 2. The flexible external gear 3 is flexed into an ellipse by the elliptical wave generator 4, to thereby engage with the rigid internal gear 2 at the two end portions thereof in the direction of the major axis L1 of the ellipse (the minor axis of the ellipse is shown by L2 in FIG. 1). Rotation of the wave generator 4 causes the locations at which the teeth 24 and 34 of the gears 2, 3 mesh to move circumferentially, generating relative rotation between the two gears that corresponds to the difference in the number of teeth of the two gears. The flexible external gear 3 comprises a flexible cylindrical body 31, a radially expanding diaphragm 32 that is continuous with a back end 31a thereof, a boss 33 that is continuous with the diaphragm 32, and external teeth 34 formed on the outer peripheral surface of an opening end 31b of the cylindrical body 31. The external teeth 34 comprise a back portion 34a and opening end portion 34b.

The elliptical profile of the wave generator 4 provided on the inside peripheral surface of the external teeth portion of the cylindrical body portion 31, enables the amount by which the cylindrical body portion 31 is flexed radially inwards or outwards from the back end 31a to the opening end 31b to be gradually increased. As shown in FIG. 2(b), the outward deflection at a cross-section that includes the major axis L1 of the ellipse, going from the back end 31a to the opening end 31b, increases by an amount proportional to the distance from the back end 31a.

Method of Forming Tooth Profile in Main Cross-section

Figure 3:
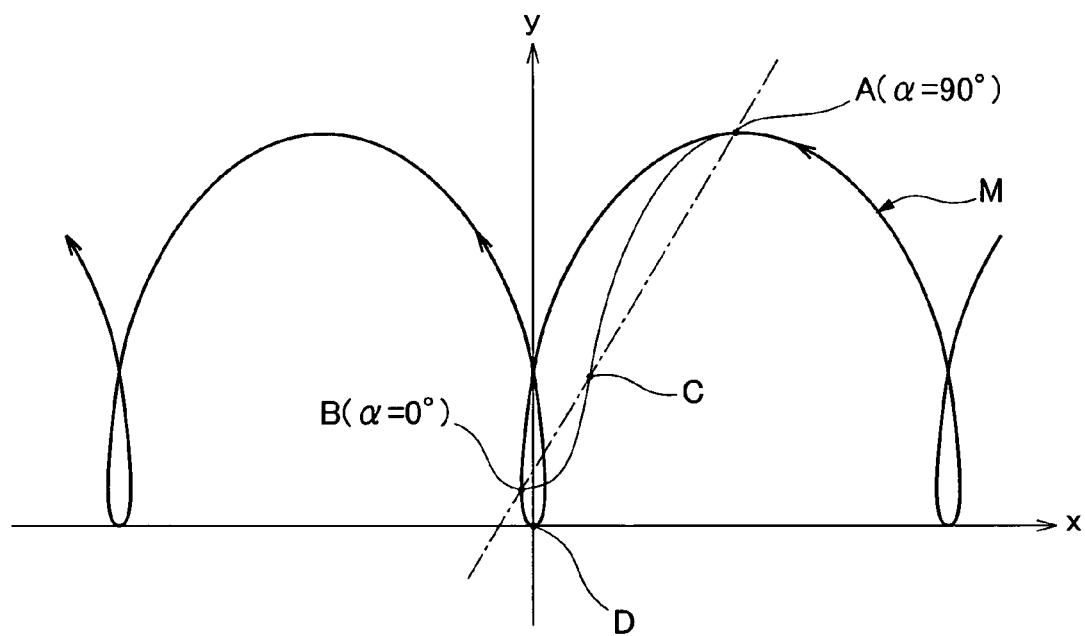
FIG. 3 shows the moving route of a rack in a case in which the tooth profile formation of the present invention is based on $\kappa>1$.

FIG. 3 shows the moving route of the teeth of the flexible external gear 3 with respect to the rigid internal gear 2, in a case in which relative movement between the gears 2 and 3 of the wave gear drive 1 is rack-approximated. The x axis is the direction of translational movement of the rack, and the y axis is movement orthogonal thereto, The moving route M is that obtained in the main cross-section 35 (cross-section perpendicular to the axis at a prescribed location in the direction of the tooth trace of the teeth 34 of the flexible external gear 3).

The moving route M of a tooth of the gear 3 is given by the following equation.

$$x = 0.5\, mn(\eta - \kappa \sin \eta)$$
$$y = \kappa mn(1 - \cos \eta)$$

Here, m is module. Also, the total amplitude of the moving route M of the flexible external gear 3 is 2 κmn, where κ>1 signifying positive deflection.

If m=1 and n=1, moving route M can be expressed by equation (1).

$$x = 0.5(\eta - \kappa \sin \eta)$$
$$y = \kappa(1 - \cos \eta) \quad (1)$$

Point A, where $\eta=\pi$, is the shallowest point on the moving route M. The pressure angle α formed by a tangent of the moving route M with respect to the y axis is given by equation (2).

$$\alpha = \tan^{-1} \frac{\frac{dx}{d\eta}}{\frac{dy}{d\eta}} = \tan^{-1} \frac{0.5(1 - \kappa \cos \eta)}{\kappa \sin \eta} \quad (2)$$

Here, if α=0 and the corresponding η value $\eta_0$ ($\eta_0$>0) is determined, the following equation is obtained.

$$\eta_0 = \cos^{-1} \frac{1}{\kappa} \quad (3)$$

The coordinates of point B on the moving route M corresponding to a positive value for $\eta_0$ are expressed in terms of $x_0$, $y_0$.

$$x_0 = 0.5(\eta - \kappa \sin \eta_0)$$
$$y_0 = \kappa(1 - \cos \eta_0) \quad (4)$$

Taking the range of parameter η of the moving route M from $\eta_0$ (point B) to π (point A), the first similar curve AC is obtained by a similarity transformation in which the route is multiplied by λ(λ<1), using the η=π point A as the center of similarity. This first similar curve AC is used as the basic addendum tooth profile of the rigid internal gear 2.

Next, using endpoint C of the first similar curve AC as the center of similarity transformation, the first similar curve AC is multiplied by a ratio of similitude (1−λ)/λ, and the curve thus obtained is rotated 180° around endpoint C to obtain the second similar curve CB, which is adopted as the basic addendum tooth profile of the flexible external gear 3.

The basic addendum tooth profile of the rigid internal gear 2 defined by the similarity curve AC is expressed by equation (5), and the basic addendum tooth profile of the flexible external gear 3 defined by the similarity curve CB is expressed by equation (6).

Rigid Internal Gear Basic Addendum Tooth Profile Equation $$x_{Ca} = 0.5\{(1-\lambda)\pi + \lambda(\eta - \kappa \sin \eta)\}$$
$$y_{Ca} = \kappa\{2 - \lambda(1 + \cos \eta)\}$$
$$(\eta_0 \leq \eta \leq \pi) \quad (5)$$

Flexible External Gear Basic Addendum Tooth Profile Equation $$x_{Fa} = 0.5\{\eta_0 - \kappa \sin \eta_0 + (1-\lambda)(\pi - \eta + \kappa \sin \eta)\}$$
$$y_{Fa} = \kappa\{1 + (1-\lambda)(1 + \cos \eta)\} - 1$$
$$(\eta_0 \leq \eta \leq \pi) \quad (6)$$

Figure 4:
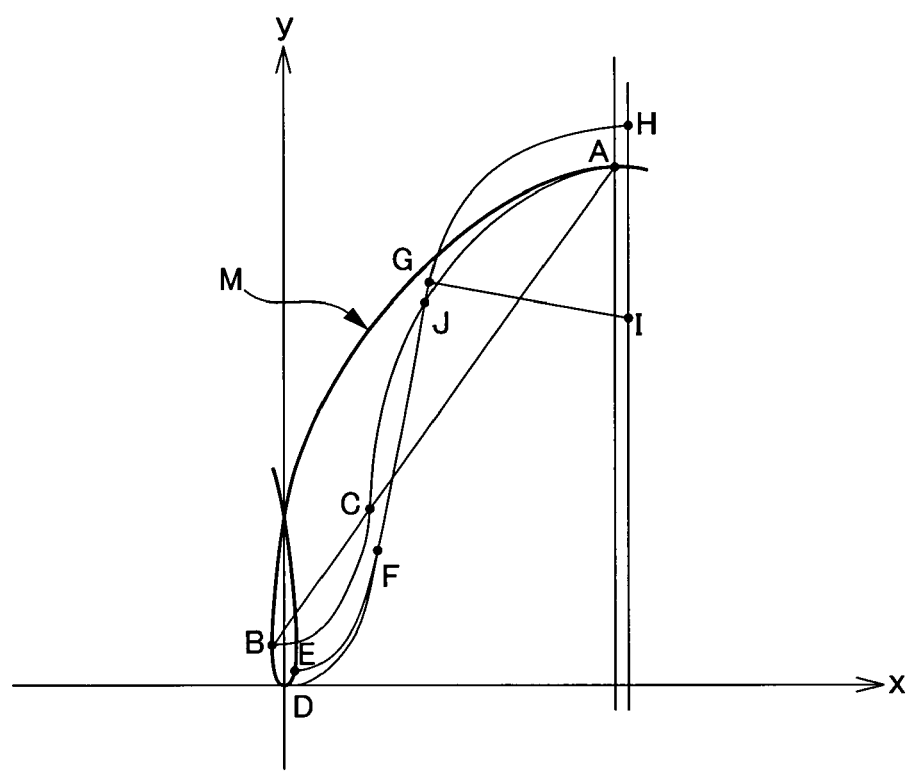
FIG. 4 is an explanatory diagram showing the moving route of FIG. 3 utilized for tooth profile formation.

FIG. 4 is a diagram for explaining the utilization range of the moving route M. The range used is that from meshing initiation point A (η=π) to the minimum pressure angle α=0° point B (η=$\eta_0$) (part of this range, in practice), and that from the deepest meshing position point D to the point E of the meshing departing portion where the pressure angle is $\alpha_e°$ (0<$\alpha_e$<20°). A moving route that is in this range is used (η=π to −$\eta_e$).

On the moving route M, within the range η=0 to −$\eta_e$ (within which range α changes from 90° to $\alpha_e°$), the value of η corresponding to the point E pressure angle $\alpha_e$ is $\eta_e$ ($\eta_e$<0). The coordinates of point E are given by the following equation.

$$x_E = 0.5(\eta_e - \kappa \sin \eta_e)$$
$$y_E = \kappa(1 - \cos \eta_e) \quad (7)$$

Here, using equation (2) to reduce η, angle $\eta_e$ corresponding to $\alpha_e$ is given as follows.

$$\eta_e = \sin^{-1} \frac{\tan \alpha_e - \sqrt{\tan^2 \alpha_e - (1-\kappa^2)(0.25 + \tan^2 \alpha_e)}}{2\kappa(0.25 + \tan^2 \alpha_e)} \quad (8)$$

Point F, which occurs when the basic addendum tooth profile CB of the flexible external gear 3 has reached a point at which the pressure angle is $\alpha_e$ is obtained in a case in which the endpoint B of the profile has come to point E on the moving route. This point F is used to draw a tangent FG that connects to the basic addendum tooth profile. The curve EF thus obtained, and the intermediate tooth profile constituted by the line FG, form the main part of the tooth profile of the flexible external gear 3. Also, the dedendum profile curve GH is connected to the composite tooth profile thus obtained to preclude interference with the basic addendum tooth profile of the rigid internal gear 2. The dedendum tooth profile curve GH is defined as a single circular arc, for example. The thus-obtained addendum tooth profile, intermediate tooth profile and dedendum tooth profile form the tooth profile of the teeth 34 of the flexible external gear 3.

Next, obtaining tooth profiles of portions other than that of the addendum of the rigid internal gear 2 is explained. First, the following equation is used to obtain the dedendum tooth profile of the rigid internal gear 2 generated during the movement of the addendum tooth profile CB of the flexible external gear 3, on the moving route M, from the deepest meshing point D to the point E of the meshing departing portion at which the pressure angle is $\alpha_e°$. Rigid Internal Gear Dedendum Tooth Profile Equation $$x = 0.5\{(1-\lambda)(\pi - t + \kappa \sin t) + \eta - \kappa \sin \eta\} \quad (9)$$
$$y = \kappa\{(1-\lambda)(1 + \cos t) + 1 - \cos \eta\}$$
$$t = \cos^{-1}\left[\frac{\kappa\left(\frac{\sin \eta}{1 - \kappa \cos \eta}\right)^2}{1 + \left(\frac{\kappa \sin \eta}{1 - \kappa \cos \eta}\right)^2} - \right.$$

-continued $$\sqrt{\left[\frac{\left\{\kappa\left(\frac{\sin\eta}{1-\kappa\cos\eta}\right)^2\right\}}{1+\left(\frac{\kappa\sin\eta}{1-\kappa\cos\eta}\right)^2}\right]-\left[\frac{\left(\frac{\sin\eta}{1-\kappa\cos\eta}\right)^2-1}{\left(\frac{\kappa\sin\eta}{1-\kappa\cos\eta}\right)^2+1}\right]}$$

$\eta_e \leq \eta \leq 0$ $\eta = \eta_e \rightarrow t = t_e$

The dedendum tooth profile and the addendum tooth profile AC of the rigid internal gear 2 are joined by a straight line that is a tangent to the endpoint F of the dedendum tooth profile. This line intersects the dedendum tooth profile at a slight angle. The straight tooth profile of this intermediate portion of the rigid internal gear 2 is given by the following equation.

$x=0.5\{\eta_e-\kappa \sin \eta_e+(1-\lambda)(\pi-t_e+\kappa \sin t_e)\}+l \sin \alpha_e$ $y=\kappa\{1-\cos \eta_e+(1-\lambda)(1+\cos t_e)\}+l \cos \alpha_e$ \hfill (10)

The thus-obtained addendum tooth profile, linear intermediate tooth profile and dedendum tooth profile form the tooth profile of the teeth 24 of the rigid internal gear 2.

Next, the radius and center of the circular arc GH that defines the dedendum fillet of the flexible external gear 3 are obtained as follows. The addendum profile CB of the flexible external gear 3 may be given by equation (6); it is considered, with the origin B moved, at the place of momentary contact between adjacent linear tooth profiles at the end of the meshing between the flexible external gear 3 and rigid internal gear 2. Specifically, the following equation gives the addendum tooth profile when the origin is at point E.

Addendum Tooth Profile of Flexible External Gear $x=0.5\{\eta_e-\kappa \sin \eta_e+(1-\lambda)(\pi-\eta+\kappa \sin \eta)\}$ $y=\kappa\{1-\cos \eta_e+(1-\lambda)(1+\cos \eta)\}$ $\eta_e \leq \eta \leq \pi$ \hfill (11)

The linear part of the tooth profile of the flexible external gear is given by the following equation, with the $l_{max}$ setting depending on the top clearance.

$x=0.5\{\eta_e-\kappa \sin \eta_e+(1-\lambda)(\pi-t_e+\kappa \sin t_e)\}+l \sin \alpha_e$ $y=\kappa\{1-\cos \eta_e+(1-\lambda)(1+\cos t_e)\}+l \cos \alpha_e$ $0 \leq l \leq l_{max}$ \hfill (12)

The radius ρ of the circular arc part of the dedendum on the flexible external gear is given by the following equation.

$$\rho = \frac{0.5\pi + x_E - x_G}{\cos \alpha_e} \hfill (13)$$

$x_G = 0.5\{\eta_e - \kappa \sin\eta_e + (1-\lambda)(\pi - t_e + \kappa \sin t_e)\} + l_{max} \sin \alpha_e$ The circular arc center I is given by the following equation.

$x_I=0.5\pi+x_E$ $y_I=y_G-\rho \sin \alpha_e$ $y_G=\kappa\{1-\cos \eta_e+(1-\lambda)(1+\cos t_e)\}+l_{max} \cos \alpha_e$ \hfill (14)

Figure 5:
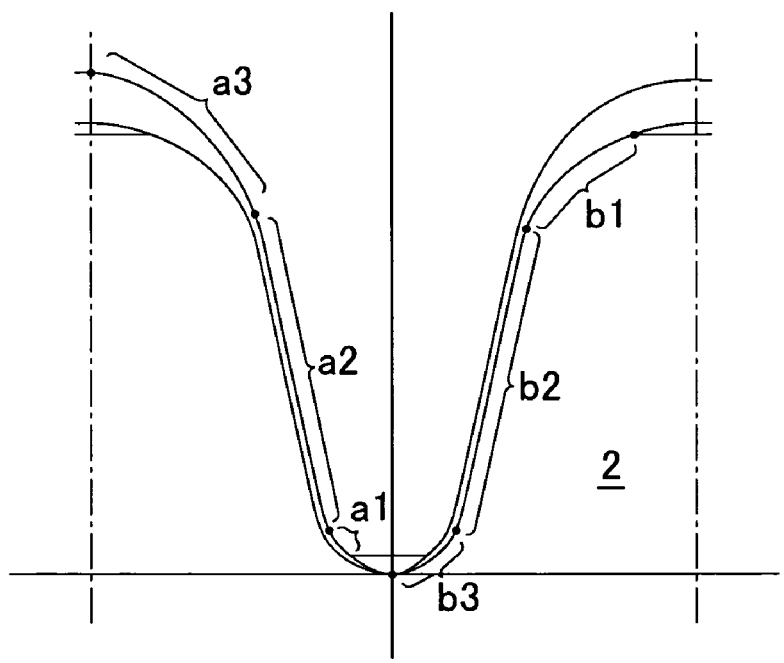
FIG. 5 is an explanatory diagram showing an example of the tooth profiles set for the two gears.

FIG. 5 shows an example of tooth profiles thus obtained. The fillet of the flexible external gear 3 is set to maintain top clearance with respect to the tooth profile of the rigid internal gear 2. As shown, the tooth profile of the flexible external gear 3, obtained as described in the foregoing, comprises an addendum tooth profile a1, a linear intermediate tooth profile a2 and a dedendum tooth profile a3. The tooth profile of the rigid internal gear 2 similarly comprises an addendum tooth profile b1, a linear intermediate tooth profile b2 and a dedendum tooth profile b3.

As explained in the above, in this embodiment a similar curve AC obtained by multiplying curve AB of the moving route M by λ, or a similar curve obtained by multiplying a portion of the curve AB by λ, is employed as the addendum tooth profile of the rigid internal gear. Also, a similar curve CB obtained by multiplying that similar curve by (1−λ)/λ, or a portion thereof, is employed as the addendum profile of the flexible external gear. Accordingly, due to the nature of similarity, continuous meshing of the addendum tooth profiles of the gears 2 and 3 can be achieved when the teeth of the flexible external gear 3 are moved along the moving route AB.

Also, after reaching the deepest part of the moving route M, the addendum tooth profile of the flexible external gear 3 meshes with the dedendum tooth profile of the rigid internal gear 2 from point D to point E on the moving route M. At the end of the meshing, the linear portions of the two tooth profiles come into contact.

Figure 6:
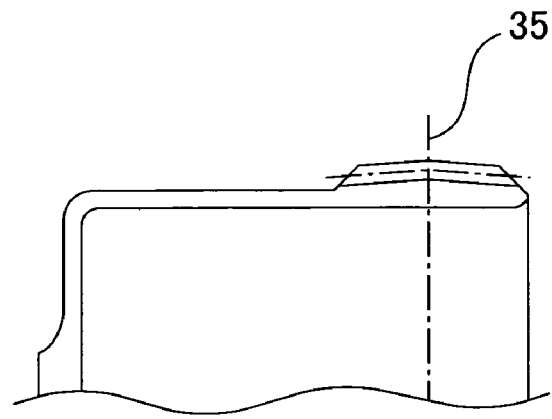
FIG. 6 is an explanatory diagram showing the tooth shape used by the two gears to realize effective meshing other than at the main cross-section.
Figure 6:
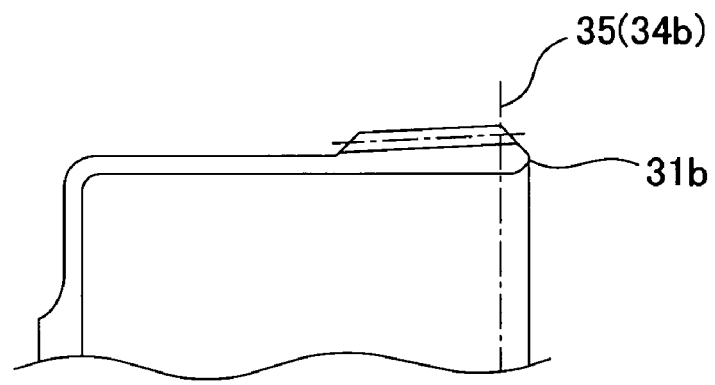

Tooth Profiles at Cross-sections Perpendicular to the Axis Other Than the Main Cross-section In this embodiment, in order to maintain effective meshing at cross-sections perpendicular to the axis other than the main cross-section 35, in an axial cross-section that includes the major axis after deformation of the flexible external gear 3, as shown in FIG. 6(*a*), relieving is applied from the main cross-section to the opening portion and the diaphragm.

When the main cross-section takes in the opening portion, relieving is applied to the teeth of the flexible external gear 3, as shown in FIG. 6(*b*), so that meshing can be maintained in all cross-sections of the tooth trace, from the opening portion to the diaphragm side.

When this relieving is carried out, the position of the shallowest apex of the moving route obtained in each cross-section perpendicular to the tooth trace of the flexible external gear can match the position of the shallowest apex of the moving route in the main cross-section, allowing meshing to be effectively maintained in cross-sections perpendicular to the axis as well as in the main cross-section.

The invention claimed is:

1. A wave gear drive, comprising:
    a circular rigid internal gear;
    a flexible external gear disposed within the rigid internal gear;
    a wave generator disposed within the flexible external gear;
    the flexible external gear having a flexible cylindrical body and an annular diaphragm that extends in a radial direction from a back end of the cylindrical body, a toothed portion formed on a front end opening portion of the cylindrical body that is flexed into an elliptical shape by a flexing amount generated by the wave generator from a back end portion on the diaphragm side to a front end portion on the opening side thereof that is approximately proportional to distance from the diaphragm;
    wherein a cross-section of the flexible external gear perpendicular to the axis at a prescribed location in a tooth trace direction of the flexible external gear is set to be a main cross-section;

the rigid internal gear and flexible external gear are gears with a module m;

the flexible external gear has a number of teeth that is set to be smaller by 2 n, wherein n is a positive integer, than a number of teeth of the rigid internal gear;

a radial flexing amount of a major axis of an elliptical rim neutral line of the flexible external gear is set at κmn, wherein κ>1;

wherein a tooth of the flexible external gear follows a moving route (M) with respect to a tooth of the rigid internal gear that accompanies rotation of the wave generator when meshing of the teeth in the main cross-section is approximated by rack meshing;

on an entering side of the meshing of the teeth to the major axis of the moving route (M), a first similar curve (AC) is obtained by similarity transformation of a pressure angle α defined as an angle of inclination in a direction orthogonal to the direction of the moving route (M) in a range that is from 90° at a first point (A) in an initial meshing phase to a minimum of 0° at a second point (B), or a range that is midway from the first point (A) to the second point (B), using a first ratio of similitude λ, wherein λ<1, with the first point (A) as center of similarity, the first similar curve (AC) is employed as a basic addendum tooth profile of the rigid internal gear, a second similar curve (CB) is obtained by rotating the first similar curve (AC) through an angle of 180° with an endpoint (C) thereof as center of similarity, and by similarity transformation in which the first similar curve (AC) is multiplied by a second ratio of similitude $(1-\lambda)/\lambda$, and the second similar curve (CB) is employed as a basic addendum tooth profile of the flexible external gear.

2. The wave gear drive according to claim 1, wherein a generation curve is obtained that is generated by moving the basic tooth profile defined by the second similar curve (CB) of the flexible external gear along the moving route (M), from a deepest point (D) on the major axis of the moving route (M) to a third point (E) on a tooth departing side on the moving route (M) at which the pressure angle is $\alpha_e$, wherein $0° < \alpha_e < 20°$, the generation curve is employed as a basic dedendum tooth profile of the rigid internal gear, and at a fourth point (F) on the generation curve corresponding to the endpoint (C) on the second similar curve (CB), a dedendum tooth profile defined by the generation curve and the basic addendum profile defined by the first similar curve (AC) are connected by a straight line representing a line tangent to the generation curve, and employed to form a full tooth profile of the rigid internal gear.

3. The wave gear drive according to claim 2, wherein at the fourth point (F) which occurs when the second similar curve (CB) has reached a point at which the pressure angle is $\alpha_e$ when the second point (B) of the second similar curve (CB) that defines the basic addendum tooth profile of the flexible external gear reaches the third point (E) on the moving route (M), the straight line (FG) of a prescribed length representing a line tangent to the generation curve is connected to the fourth point (F) of a first curve (EF), and a fifth point (G) of line (FG) is smoothly connected to a fillet curve (GH) that defines a dedendum tooth profile of the flexible external gear so as not to interfere with the basic addendum tooth profile of the rigid internal gear, whereby obtaining a full tooth profile of the flexible external gear.

4. The wave gear drive according to claim 3, wherein relieving is applied that extends from the main cross-section of the flexible external gear to the opening portion and the diaphragm.

5. The wave gear drive according to claim 3, wherein the main cross-section of the flexible external gear takes in the opening portion, relieving is applied that extends to the diaphragm, and a position of the shallowest apex of the moving route obtained in each cross-section perpendicular to the tooth trace of the flexible external gear matches the opening portion.

* * * * *